(12) United States Patent
Yu et al.

(10) Patent No.: US 10,826,063 B2
(45) Date of Patent: Nov. 3, 2020

(54) LITHIUM SECONDARY BATTERY

(71) Applicant: LG Chem, Ltd., Seoul (KR)

(72) Inventors: Sung Hoon Yu, Daejeon (KR); Kyung Mi Lee, Daejeon (KR); Doo Kyung Yang, Daejeon (KR); Yoo Sun Kang, Daejeon (KR); Jung Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 93 days.

(21) Appl. No.: 16/130,019

(22) Filed: Sep. 13, 2018

(65) Prior Publication Data

US 2019/0013520 A1 Jan. 10, 2019

Related U.S. Application Data

(62) Division of application No. 14/442,023, filed as application No. PCT/KR2014/010137 on Oct. 27, 2014, now Pat. No. 10,115,968.

(30) Foreign Application Priority Data

Oct. 28, 2013 (KR) .................. 10-2013-0128641

(51) Int. Cl.
*H01M 4/525* (2010.01)
*H01M 10/0525* (2010.01)
(Continued)

(52) U.S. Cl.
CPC .......... *H01M 4/525* (2013.01); *H01M 4/485* (2013.01); *H01M 4/505* (2013.01); *H01M 4/60* (2013.01); *H01M 4/62* (2013.01); *H01M 6/168* (2013.01); *H01M 10/052* (2013.01); *H01M 10/0525* (2013.01); *H01M 10/0567* (2013.01); *H01M 10/0569* (2013.01); *H01M 10/0568* (2013.01); *H01M 2004/028* (2013.01)

(58) Field of Classification Search
CPC ... H01M 6/168; H01M 10/0567; H01M 4/525
USPC ......................................... 429/324
See application file for complete search history.

(56) References Cited

U.S. PATENT DOCUMENTS

2005/0221195 A1 10/2005 Uchida et al.
2008/0118843 A1 5/2008 Tarnopolsky
(Continued)

FOREIGN PATENT DOCUMENTS

EP 1037293 A1 9/2000
JP 2001319685 A 11/2001
(Continued)

OTHER PUBLICATIONS

Extended Search Report for European Application No. 148577661.1, dated Nov. 20, 2015.
(Continued)

*Primary Examiner* — James M Erwin
(74) *Attorney, Agent, or Firm* — Lerner, David, Littenberg, Krumholz & Mentlik, LLP

(57) ABSTRACT

The present invention may improve the lifetime characteristics of a lithium secondary battery, and particularly, may provide a non-aqueous electrolyte solution or cathode including a phosphate-based compound which may exhibit stable and excellent lifetime characteristics at high temperature and high voltage regardless of the moisture content or the presence of a pressing process of the electrode.

13 Claims, 9 Drawing Sheets

(51) Int. Cl.
*H01M 4/505* (2010.01)
*H01M 6/16* (2006.01)
*H01M 10/0567* (2010.01)
*H01M 10/0569* (2010.01)
*H01M 4/485* (2010.01)
*H01M 4/62* (2006.01)
*H01M 10/052* (2010.01)
*H01M 4/60* (2006.01)
*H01M 4/02* (2006.01)
*H01M 10/0568* (2010.01)

(56) References Cited

U.S. PATENT DOCUMENTS

| | | |
|---|---|---|
| 2010/0273065 A1 | 10/2010 | Lee et al. |
| 2011/0111305 A1 | 5/2011 | Jeon et al. |
| 2011/0136006 A1 | 6/2011 | Nogi et al. |
| 2011/0269026 A1 | 11/2011 | Zhao et al. |
| 2012/0202122 A1 | 8/2012 | Han |
| 2012/0231325 A1 | 9/2012 | Yoon |
| 2012/0244414 A1 | 9/2012 | Inagaki et al. |
| 2013/0028939 A1 | 1/2013 | Grotzinger |
| 2013/0029219 A1 | 1/2013 | Inagaki et al. |
| 2013/0250485 A1 | 9/2013 | Kaye et al. |
| 2014/0120414 A1 | 5/2014 | Bhat et al. |
| 2015/0099193 A1 | 4/2015 | Hamasaki et al. |
| 2016/0240888 A1 | 8/2016 | Hamasaki et al. |

FOREIGN PATENT DOCUMENTS

| | | |
|---|---|---|
| JP | 2014522078 A | 8/2014 |
| JP | 2015072867 A | 4/2015 |
| JP | 2015076403 A | 4/2015 |
| JP | 2015092470 A | 5/2015 |
| JP | 2015092477 A | 5/2015 |
| KR | 10708210 B1 | 4/2007 |
| KR | 100804696 B1 | 2/2008 |
| KR | 20080108043 A | 12/2008 |
| KR | 20090018003 A | 2/2009 |
| KR | 20100090150 A | 8/2010 |
| KR | 20120103519 A | 9/2012 |
| KR | 20120132811 A | 12/2012 |

OTHER PUBLICATIONS

International Search Report for Application No. PCT/KR2014/010137 dated Jan. 28, 2015.
Keiji Yamamoto et al., "Composition of "Polyphosphoric Acid Trimethylsilyl Ester PPSE" and Its Use As a Condensation Reagent," Chemistry Letters, No. 8, Jan. 1, 1982, p. 1225-1228, XP055228051.
Machine translation of Kwon et al. (KR 20100090150 A).

US 10,826,063 B2

LITHIUM SECONDARY BATTERY

CROSS REFERENCE TO RELATED APPLICATIONS

The present application is a divisional of U.S. patent application Ser. No. 14/442,023, filed on May 11, 2015, which is a national phase entry under 35 U.S.C. § 371 of International Application No. PCT/KR2014/010137, filed Oct. 27, 2014, which claims priority from Korean Patent Application No. 10-2013-0128641, filed Oct. 28, 2013; the disclosures of which are incorporated herein by reference.

TECHNICAL FIELD

The present invention relates to a non-aqueous electrolyte solution and a cathode which include a phosphate-based compound, and a lithium secondary battery including the non-aqueous electrolyte solution and the cathode.

BACKGROUND ART

Recently, in line with the development of information and telecommunications industry, electronic devices are being miniaturized, light-weighted, reduced in thickness, and portable. As a result, the need for high energy density batteries used as power sources of such electronic devices has increased. Currently, research into lithium secondary batteries, as batteries that may best satisfy the above need, has been actively conducted.

A lithium secondary battery is a battery which is composed of a cathode, an anode, and an electrolyte and a separator which provide movement paths of lithium ions between the cathode and the anode, wherein electrical energy is generated by oxidation and reduction reactions that occur when lithium ions are stored in and released from the cathode and the anode.

A lithium secondary battery has an average discharge voltage of about 3.6 V to about 3.7 V, and one of the advantages of the lithium secondary battery is that it has a higher discharge voltage than other alkaline batteries and a nickel-cadmium battery. In order to achieve such a high operating voltage, an electrolyte composition, which is electrochemically stable in a charge and discharge voltage range of 0 V to 4.2 V, is required.

Lithium ions released from a cathode active material, such as lithium metal oxide, during initial charging of a lithium secondary battery move to an anode active material, such as a graphite-based material, to be intercalated into interlayers of the anode active material. In this case, since lithium is highly reactive, lithium reacts with an electrolyte and carbon constituting the anode active material on a surface of the anode active material, such as a graphite-based material, to form a compound such as $Li_2CO_3$, $Li_2O$, or LiOH. These compounds may form a solid electrolyte interface (SEI) on the surface of the anode active material such as a graphite-based material.

The SEI may only pass lithium ions by acting as an ion tunnel. Due to the effect of the ion tunnel, the SEI may prevent the destruction of an anode structure due to the intercalation of organic solvent molecules having a high molecular weight, which move with lithium ions in the electrolyte, into the interlayers of the anode active material. Thus, the decomposition of the electrolyte does not occur by preventing the contact between the electrolyte and the anode active material, and stable charge and discharge may be maintained by reversibly maintaining the amount of lithium ions in the electrolyte.

Typically, with respect to an electrolyte solution which does not include an electrolyte solution additive or includes an electrolyte solution additive having poor characteristics, it is difficult to expect the improvement of lifetime characteristics due to the formation of a non-uniform SEI. Furthermore, even if an electrolyte solution additive is included, in the case that the addition amount thereof is not controlled to the required amount, the surface of a cathode may be decomposed or an oxidation reaction of the electrolyte may occur during a high temperature reaction due to the electrolyte solution additive. Thus, eventually, irreversible capacity of a secondary battery may increase and lifetime characteristics may degrade.

PRIOR ART DOCUMENTS

Patent Document

Korean Patent Application Laid-Open Publication No. KR 2012-0132811 A1

DISCLOSURE OF THE INVENTION

Technical Problem

The present invention provides a non-aqueous electrolyte solution which may improve lifetime characteristics of a secondary battery at high temperature and high voltage by adding a small amount of an additive to the non-aqueous electrolyte solution of the secondary battery.

The present invention also provides a cathode which may improve lifetime characteristics of a secondary battery at high temperature and high voltage by adding a small amount of an additive to the cathode of the secondary battery.

The present invention also provides a lithium secondary battery including the non-aqueous electrolyte solution or the cathode.

Technical Solution

According to an aspect of the present invention, there is provided a non-aqueous electrolyte solution including: a lithium salt; an electrolyte solution solvent; and a compound represented by Chemical Formula 1:

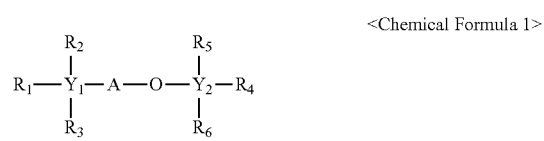

<Chemical Formula 1> in the above chemical formula, $Y_1$ and $Y_2$ are each independently silicon (Si) or tin (Sn), $R_1$ to $R_6$ are each independently hydrogen or a $C_1$-$C_{10}$ alkyl group, and A is

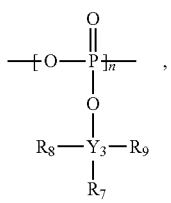

where $Y_3$ is Si or Sn,
$R_7$ to $R_9$ are each independently hydrogen or a $C_1$-$C_{10}$ alkyl group, and
n is between 2 and 4.

According to another aspect of the present invention, there is provided a cathode including a lithium transition metal oxide and a compound represented by Chemical Formula 1.

Advantageous Effects

According to a non-aqueous electrolyte solution and a cathode which include a compound of Chemical Formula 1 according to an embodiment of the present invention, lifetime characteristics of a lithium secondary battery may be improved, and in particular, lifetime characteristics at a high temperature of 45° C. or more and a high voltage of 4.3 V or more. Also, stable and excellent lifetime characteristics at high temperature and high voltage may be achieved regardless of the moisture content or the presence of drying and pressing processes of an electrode.

MODE FOR CARRYING OUT THE INVENTION

Figure 1:
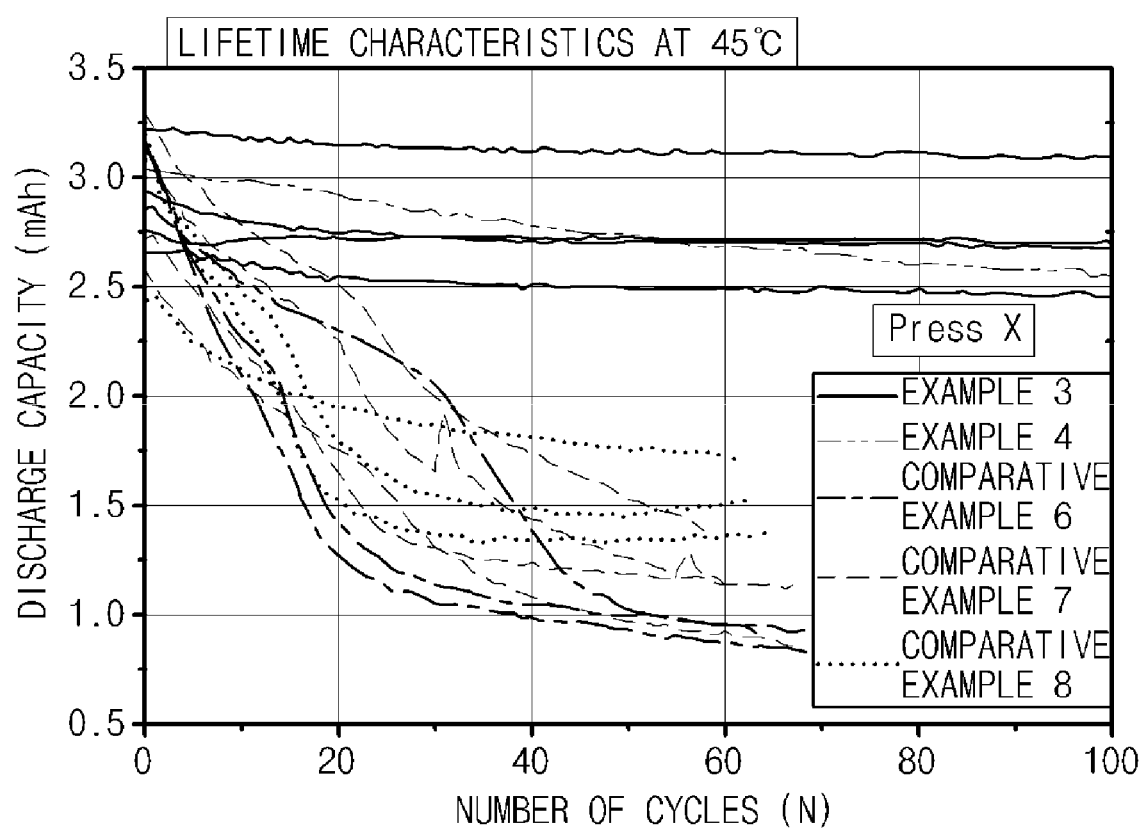
FIG. 1 is a graph illustrating the results of the measurement of lifetime characteristics at 45° C. of secondary batteries not subjected to roll-pressing of a cathode in lithium secondary batteries of Examples 3 and 4 and Comparative Examples 6 to 8.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

According to an embodiment of the present invention, the present invention may provide a non-aqueous electrolyte solution including a lithium salt; an electrolyte solution solvent; and a compound represented by Chemical Formula 1.

<Chemical Formula 1>

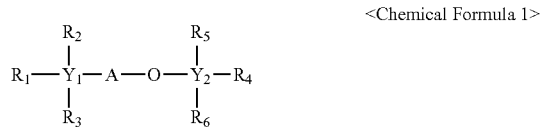

in the above chemical formula,
$Y_1$ and $Y_2$ are each independently silicon (Si) or tin (Sn),
$R_1$ to $R_6$ are each independently hydrogen or a $C_1$-$C_{10}$ alkyl group, and
A is

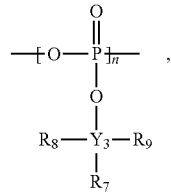

where $Y_3$ is Si or Sn,
$R_7$ to $R_9$ are each independently hydrogen or a $C_1$-$C_{10}$ alkyl group, and
n is between 2 and 4.

According to an embodiment of the present invention, in the case that n is 3 or 4 in A of Chemical Formula 1, A may be formed by connecting phosphorous (P) of one repeating unit and oxygen (O) of another adjacent repeating unit to each other to form a linear chain, a cyclic chain, or both linear and cyclic chains.

The compound represented by Chemical Formula 1 according to an embodiment of the present invention, for example, may be any one selected from the group consisting of compounds of (1) to (6), or a mixture of two or more thereof:

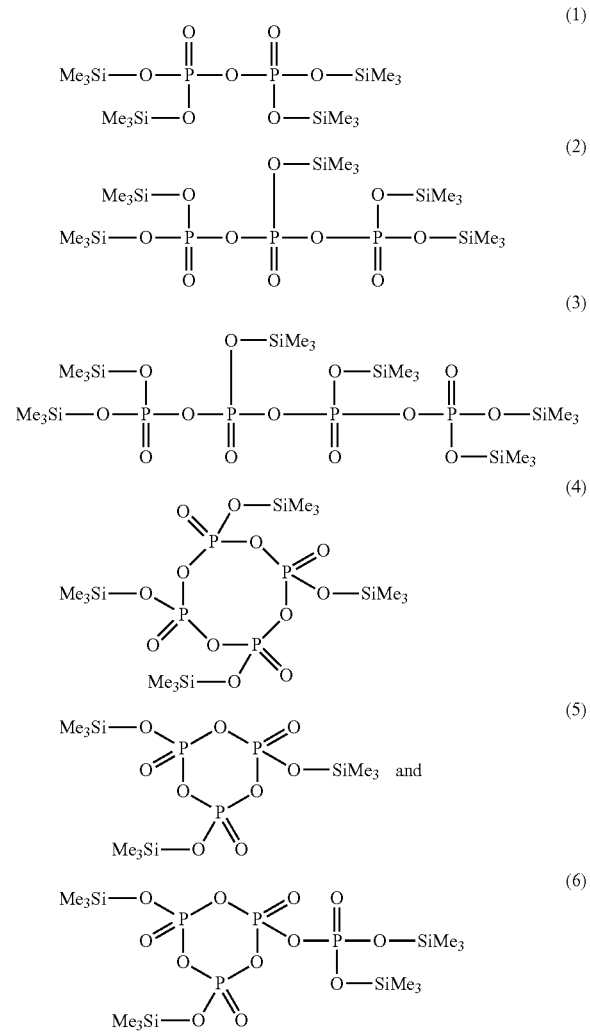

wherein Me represents $CH_3$.

In general, in a non-aqueous electrolyte solution used in a lithium secondary battery, since an electrolyte solution solvent may be decomposed on the surface of an electrode during charge and discharge of the battery or may destruct an anode structure by co-intercalating into interlayers of a carbon material anode, the electrolyte solution solvent may decrease the stability of the battery.

It is known that the above limitations may be addressed by a solid electrolyte interface (SEI) that is formed on the surface of an anode by the reduction of the electrolyte solution solvent during initial charge of the battery. However, since it is generally not sufficient for the SEI to act as a continuous protective layer of the anode, lifetime and performance may eventually degrade when a charge and discharge cycle of the battery is repeated. In particular, since a SEI of a typical lithium secondary battery is not thermally stable, the SEI may be easily destructed due to thermal energy that is increased according to the elapsed time when the battery is operated or left standing at high temperature. As a result, the battery performance may further degrade at high temperature, and in particular, gas, such as $CO_2$, may be continuously generated due to the destruction of the SEI and the decomposition of the electrolyte solution. Thus, the internal pressure and thickness of the battery may be increased.

According to an embodiment of the present invention, in the case that the compound represented by Chemical Formula 1 is added to a non-aqueous electrolyte solution or electrode of a lithium secondary battery, the thickness increase and performance degradation of the battery due to the destruction of the SEI of the lithium secondary battery may not only be improved, but the lifetime characteristics of the secondary battery, particularly, at a high temperature of 45° C. or more and a high voltage of 4.3 V or more may also be improved.

In particular, the non-aqueous electrolyte solution including the additive may exhibit stable and excellent lifetime characteristics at high temperature and high voltage regardless of a moisture content of the electrode or the presence of drying and pressing processes of the electrode during the preparation of the secondary battery.

Specifically, the additive of Chemical Formula 1 may act to stabilize anions of the lithium salt. For example, in the case that the electrolyte solution includes a fluorine (F)-containing material such as $LiPF_6$, the fluorine may react with water or lithium impurities during charge and discharge to form hydrofluoric acid (HF), and an electrode cycle may be degraded due to corrosion caused by the HF. In this case, the additive may suppress the formation of HF which may be formed due to side reactions between the electrolyte solution and water formed during the charge and discharge.

Also, since the compound of Chemical Formula 1 with a less stable structure than a typical phosphate-based compound having a simple structure, for example, a structure of a phosphate-based compound in which n in Chemical Formula 1 is 2 or more, is electrochemically unstable, the compound may be easily broken to participate in the formation of a film of the electrode and in particular, the compound may form a conductive film. Thus, the above two factors may significantly affect the performance improvement when the compound is used in the secondary battery.

Furthermore, according to an embodiment of the present invention, the non-aqueous electrolyte solution may further include a compound represented by the following Chemical Formula 2:

<Chemical Formula 2>

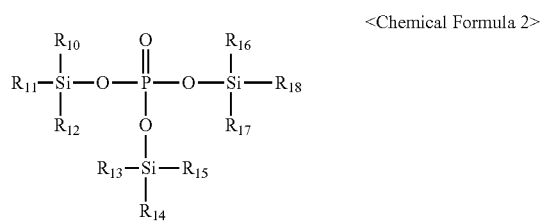

in the above chemical formula, $R_{10}$ to $R_{18}$ are each independently hydrogen or a $C_1$-$C_{10}$ alkyl group.

According to an embodiment of the present invention, the compound represented by Chemical Formula 2, for example, may be tris(trimethylsilyl)phosphate (TMSPa).

A mixing ratio of the compound represented by Chemical Formula 1 to the compound represented by Chemical Formula 2 is in a range of 1:0.1 to 1:2, may be in a range of 1:0.2 to 1:1, and for example, may be in a range of 1:0.2 to 1:0.6 as a weight ratio.

Also, the compound represented by Chemical Formula 1 may be included in an amount of 0.01 wt % to 5 wt %, for example, 0.1 wt % to 2 wt %, based on a total weight of the non-aqueous electrolyte solution.

In the case that the amount of the compound represented by Chemical Formula 1 is excessively small, the compound may be entirely consumed during an initial operation of the secondary battery, and thus, lifetime may degrade during charge and discharge or long-term storage. In the case in which the amount of the compound represented by Chemical Formula 1 is excessively large, the capacity and stability characteristics of the battery may be adversely affected by side reactions of the remaining additive.

Any lithium salt typically used in the art may be used as the lithium salt that is included in the non-aqueous electrolyte solution according to the embodiment of the present invention. For example, the lithium salt may include any one selected from the group consisting of $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$, and $LiClO_4$, or a mixture of two or more thereof.

Also, any electrolyte solution solvent typically used in an electrolyte solution for a lithium secondary battery may be used as the electrolyte solution solvent used in the present invention without limitation, and for example, ether, ester, amide, linear carbonate, or cyclic carbonate may be used alone or in a mixture of two or more thereof.

Among these materials, the cyclic carbonate, the linear carbonate, or a carbonate compound as a mixture thereof may be typically included. Specific examples of the cyclic carbonate may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of two or more thereof.

Also, specific examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof. However, the present invention is not limited thereto.

In particular, the cyclic carbonate among the carbonate-based electrolyte solution solvents may include propylene carbonate, ethylene carbonate, and a mixture thereof. Since the propylene carbonate, ethylene carbonate, and mixture thereof are highly viscous organic solvents and have high dielectric constants, the propylene carbonate, ethylene carbonate, and mixture thereof may well dissociate the lithium salt in the electrolyte solution. Thus, the propylene carbonate, ethylene carbonate, and mixture thereof may be used.

Also, linear carbonates, such as diethyl carbonate, dimethyl carbonate, ethylmethyl carbonate, and a mixture thereof, may be used by being mixed with the cyclic carbonate. Since an electrolyte solution having high electrical conductivity may be prepared when the above cyclic carbonate is mixed with low viscosity, low dielectric constant linear carbonate in an appropriate ratio, the cyclic carbonates, for example, may be used.

Also, any one selected from the group consisting of methyl acetate, ethyl acetate, propyl acetate, ethyl propionate (EP), methyl propionate (MP), γ-butyrolactone, γ-valerolactone, γ-caprolactone, σ-valerolactone, and ε-caprolactone, or a mixture of two or more thereof may be used as the ester among the electrolyte solution solvents. Among them, low viscous EP, MP, and a mixture thereof may be particularly used.

According to another embodiment of the present invention, the present invention may provide a cathode including a lithium transition metal oxide and a compound represented by Chemical Formula 1.

According to an embodiment of the present invention, in the case that n is 3 or 4 in A of Chemical Formula 1, A may be formed by connecting P of one repeating unit and O of another adjacent repeating unit to each other to form a linear chain, a cyclic chain, or both linear and cyclic chains.

In the compound of Chemical Formula 1, the compound, for example, may be any one selected from the group consisting of compounds of (1) to (6), or a mixture of two or more thereof:

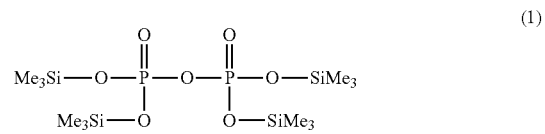

(1)

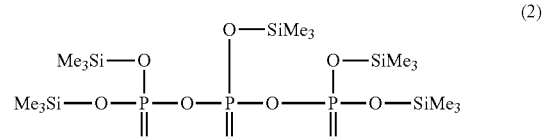

(2)

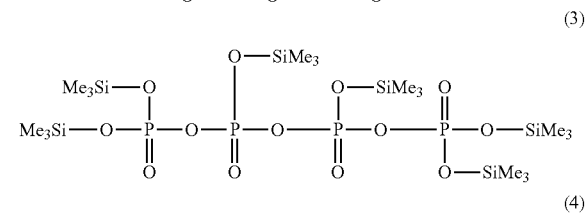

(3)

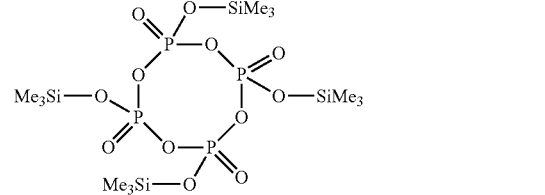

(4)

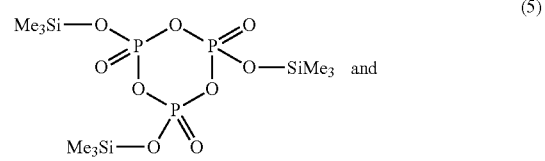

(5)

and

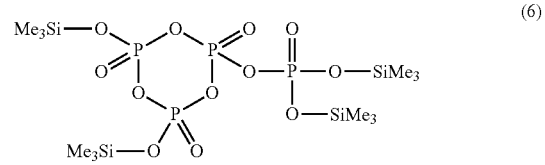

(6)

wherein Me represents $CH_3$.

Also, according to an embodiment of the present invention, the cathode may further include a compound represented by Chemical Formula 2.

According to an embodiment of the present invention, the compound represented by Chemical Formula 2, for example, may be tris(trimethylsilyl)phosphate (TMSPa).

In this case, a mixing ratio of the compound represented by Chemical Formula 1 to the compound represented by Chemical Formula 2 is in a range of 1:0.1 to 1:2, may be in a range of 1:0.2 to 1:1, and for example, may be in a range of 1:0.2 to 1:0.6 as a weight ratio.

According to an embodiment of the present invention, in the case that the compound represented by Chemical Formula 1 is included as an additive in the cathode, the lifetime characteristics of the lithium secondary battery may be improved, and the lifetime characteristics, particularly, at a high temperature of 45° C. or more and a high voltage of 4.3 V or more may be improved. Also, stable and excellent lifetime characteristics at high temperature and high voltage may be achieved regardless of the moisture content or the presence of drying and pressing processes of the electrode.

Furthermore, since the compound of Chemical Formula 1 with a less stable structure than a typical phosphate-based compound having a simple structure, for example, a structure of a phosphate-based compound in which n in Chemical Formula 1 is 2 or more, is electrochemically unstable, the compound may be easily broken to participate in the formation of a film of the electrode and in particular, the compound may form a conductive film. Thus, the above factors may significantly affect the performance improvement, particularly, the lifetime characteristics, when the compound is used in the secondary battery.

According to an embodiment of the present invention, the compound represented by Chemical Formula 1 may be included in an amount of 0.01 wt % to 5 wt %, for example, 0.1 wt % to 2 wt %, based on a total amount of a cathode mixture slurry including a cathode active material, an additive, a conductive agent, and a binder.

The cathode active material, for example, the lithium transition metal oxide, may be a compound represented by Chemical Formula 3 below:

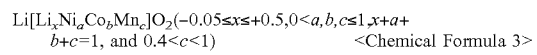
$Li[Li_xNi_aCo_bMn_c]O_2(-0.05 \leq x \leq +0.5, 0 < a,b,c \leq 1, x+a+b+c=1, \text{ and } 0.4 < c < 1)$ <Chemical Formula 3>

A lithium secondary battery according to an embodiment of the present invention may include the cathode; an anode; a separator disposed between the cathode and the anode; and a non-aqueous electrolyte solution, and the cathode or the non-aqueous electrolyte solution may include a compound of Chemical Formula 1.

As the anode active material, a carbon-based anode active material, such as crystalline carbon, amorphous carbon, or a carbon composite, may be used alone or in combination of two or more thereof. For example, the anode active material may include graphitic carbon such as natural graphite and artificial graphite.

Also, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or two or more porous polymer films may be laminated as the separator. In addition, a typical porous nonwoven fabric, for example, a nonwoven fabric formed of high melting point glass fibers or polyethylene terephthalate fibers may be used, but the present invention is not limited thereto.

A charge voltage of the lithium secondary battery according to the embodiment of the present invention may be in a range of 4.3 V to 5.0 V, and the lifetime characteristics of the battery may be excellent even if the battery is charged at a high voltage as described above.

Also, the lithium secondary battery may exhibit stable and excellent lifetime characteristics, for example, at a high temperature of 45° C. or more and a high voltage regardless of the moisture content or the presence of drying and pressing processes of the electrode.

A shape of the lithium secondary battery of the present invention is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

Preparation of Non-Aqueous Electrolyte Solution Including Chemical Formula 1

Example 1

LiPF$_6$ was dissolved in an electrolyte solution solvent having a composition, in which a volume ratio of ethylene carbonate (EC):dimethyl carbonate (DMC):ethylmethyl carbonate (EMC) was 3:4:3, to obtain a LiPF$_6$ concentration of 1 M. Also, as an additive for a non-aqueous electrolyte solution, tetra(trimethylsilyl)pyrophosphate (compound (1)) and tris(trimethylsilyl)phosphate (TMSPa) were prepared at a weight ratio of 3:1, and a non-aqueous electrolyte solution was prepared by adding the additive in an amount of 2 wt % based on a total weight of the non-aqueous electrolyte solution to the above mixture.

Example 2

A non-aqueous electrolyte solution was prepared in the same manner as in Example 1 except that tetra(trimethylsilyl)pyrophosphate was added alone as an additive for a non-aqueous electrolyte solution in the preparation of the non-aqueous solution of Example 1.

Comparative Example 1

A non-aqueous electrolyte solution was prepared in the same manner as in Example 1 except that, instead of the mixed additive of tetra(trimethylsilyl)pyrophosphate and tris(trimethylsilyl)phosphate (TMSPa), propane sultone (PS) and vinylene carbonate (VC) were prepared at a weight ratio of 1.5:1 and added as an additive for a non-aqueous electrolyte solution in the preparation of the non-aqueous solution of Example 1.

Comparative Example 2

A non-aqueous electrolyte solution was prepared in the same manner as in Example 1 except that, instead of the mixed additive of tetra(trimethylsilyl)pyrophosphate and tris(trimethylsilyl)phosphate (TMSPa), propane sultone (PS), vinylene carbonate (VC), and ethylene sulfate (ESa) were prepared at a weight ratio of 0.5:3:1 and added as an additive for a non-aqueous electrolyte solution in the preparation of the non-aqueous solution of Example 1.

Comparative Example 3

A non-aqueous electrolyte solution was prepared in the same manner as in Example 1 except that, instead of the mixed additive of tetra(trimethylsilyl)pyrophosphate and tris(trimethylsilyl)phosphate (TMSPa), propane sultone (PS) and vinylene carbonate (VC) were prepared at a weight ratio of 1.5:3 and added as an additive for a non-aqueous electrolyte solution in the preparation of the non-aqueous solution of Example 1, and $LiPF_6$ was used at a concentration of 1.3 M in the preparation of the non-aqueous solution of Example 1.

Comparative Example 4

A non-aqueous electrolyte solution was prepared in the same manner as in Example 1 except that, instead of the mixed additive of tetra(trimethylsilyl)pyrophosphate and tris(trimethylsilyl)phosphate (TMSPa), propane sultone (PS), vinylene carbonate (VC), and $LiBF_4$ were prepared at a weight ratio of 1.5:1:2 and added as an additive for a non-aqueous electrolyte solution in the preparation of the non-aqueous solution of Example 1.

Comparative Example 5

A non-aqueous electrolyte solution was prepared in the same manner as in Example 1 except that, instead of the mixed additive of tetra(trimethylsilyl)pyrophosphate and tris(trimethylsilyl)phosphate (TMSPa), TMSPa was added alone as an additive for a non-aqueous electrolyte solution in the preparation of the non-aqueous solution of Example 1.

Preparation of Lithium Secondary Battery

Example 3

A cathode mixture slurry was prepared by adding 94 wt % of $Li(Li_{0.2}Mn_{0.55}Ni_{0.15}Co_{0.1})O_2$ as a cathode active material, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode collector was coated with the cathode mixture slurry and dried to prepare a cathode.

Also, an anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode collector was coated with the anode mixture slurry and dried, and the Cu thin film was then roll-pressed to prepare an anode.

A polymer type battery was prepared by a typical method using a polyethylene (PE) separator with the cathode and anode thus prepared, and a lithium secondary battery was then completed by injecting the non-aqueous electrolyte solution prepared in Example 1.

Example 4

A lithium secondary battery was prepared in the same manner as in Example 3 except that the non-aqueous electrolyte solution prepared in Example 2 was used as a non-aqueous electrolyte solution.

Comparative Example 6

A lithium secondary battery was prepared in the same manner as in Example 3 except that the non-aqueous electrolyte solution prepared in Comparative Example 1 was used as a non-aqueous electrolyte solution.

Comparative Examples 7 to 10

Lithium secondary batteries were prepared in the same manner as in Example 3 except that the non-aqueous electrolyte solutions prepared in Comparative Examples 2 to 5 were respectively used as a non-aqueous electrolyte solution.

Experimental Example 1

Lifetime Characteristics at 45° C.—Comparison of Lifetime Characteristics of Lithium Secondary Batteries According to the Presence of Roll-Pressing Process of Cathode The lithium secondary batteries (based on a battery capacity of 3.26 mAh) prepared in Examples 3 and 4 and Comparative Examples 6 to 8 were charged at a constant current of 1 C to a voltage of 4.35 V at 45° C., and thereafter, the secondary batteries were charged at a constant voltage of 4.35 V and the charge was terminated when the charge current was 0.163 mAh. After the batteries were left standing for 10 minutes, the batteries were discharged at a constant current of 2 C to a voltage of 2.94 V. This charge and discharge cycle was repeated 1 to 100 times and 1 to 200 times. The results thereof are respectively presented in FIGS. 1 and 2.

Figure 2:
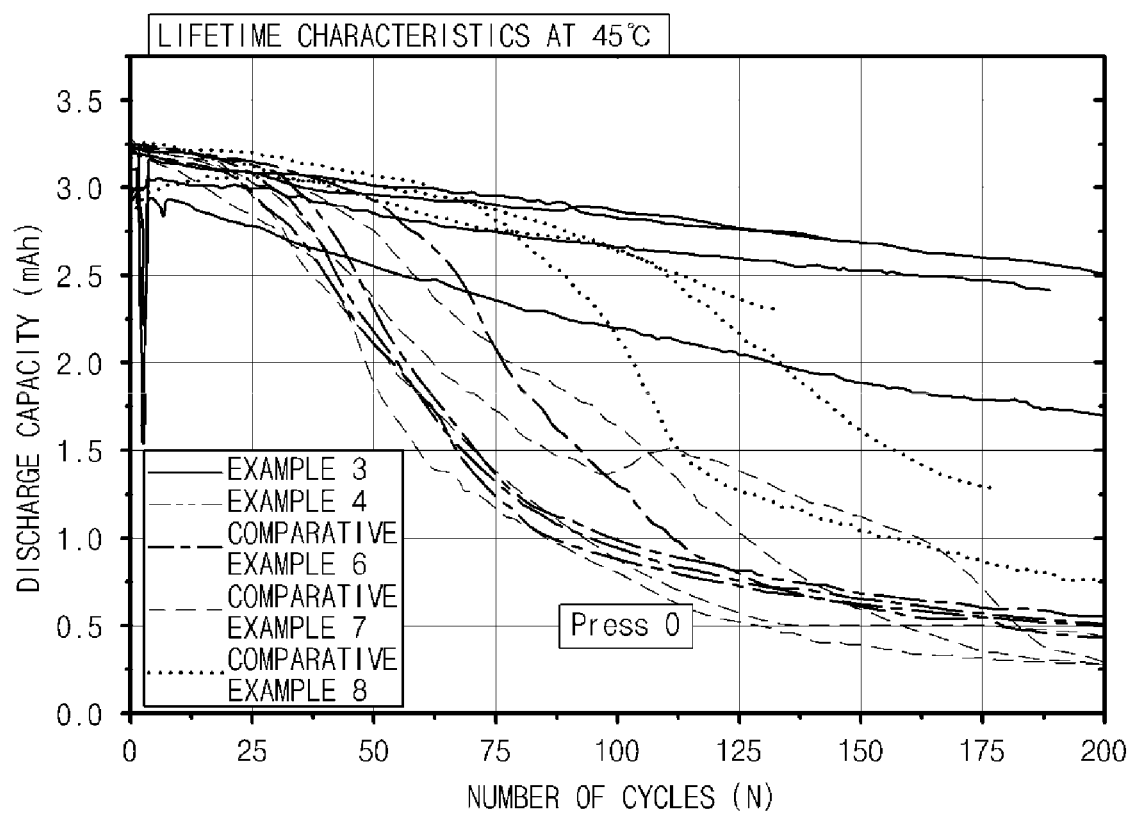
FIG. 2 is a graph illustrating the results of the measurement of lifetime characteristics at 45° C. of secondary batteries subjected to roll-pressing of a cathode in the lithium secondary batteries of Examples 3 and 4 and Comparative Examples 6 to 8.

Specifically, FIG. 1 is the results of lifetime characteristics of the lithium secondary batteries using a cathode not subjected to roll-pressing during the preparation of the cathode, and FIG. 2 is the results of lifetime characteristics of the lithium secondary batteries using a cathode subjected to roll-pressing.

Referring to FIGS. 1 and 2, the lithium secondary batteries of Examples 3 and 4 of the present invention including tetra(trimethylsilyl)pyrophosphate (compound (1)) as an additive of a non-aqueous electrolyte solution had a moderate slope to the $100^{th}$ cycle regardless of the presence of a roll-pressing process during the preparation of the cathode.

In contrast, with respect to Comparative Examples 6 to 8, in the case that roll pressing was not performed on a cathode, slopes were rapidly reduced after the first cycle and the measurement was not possible after a $70^{th}$ cycle. In the case in which the roll pressing was performed on the cathode, it may be confirmed that moderate slopes were maintained to about a $25^{th}$ cycle and the slopes were then significantly reduced to about a $50^{th}$ cycle as the number of cycles was increased.

Thus, as a result of the lifetime characteristics of FIGS. 1 and 2, in the case that tetra(trimethylsilyl)pyrophosphate was used alone or the mixed additive of tetra(trimethylsilyl)pyrophosphate and tris(trimethylsilyl)phosphate (TMSPa) was used as in the examples of the present invention, it was confirmed that excellent lifetime characteristics were obtained to the $200^{th}$ cycle regardless of the presence of a roll-pressing process of the cathode.

Experimental Example 2

Lifetime Characteristics at 45° C.—Comparison of Lifetime Characteristics of Lithium Secondary Batteries According to the Presence of Drying and Roll-Pressing Processes of Cathode The lithium secondary batteries (based on a battery capacity of 3.26 mAh) prepared in Example 3 and Comparative Examples 9 and 10 were charged at a constant current of 1 C to a voltage of 4.35 V at 45° C., and thereafter, the secondary batteries were charged at a constant voltage of 4.35 V and the charge was terminated when the charge current was 0.163 mAh. After the batteries were left standing for 10 minutes, the batteries were discharged at a constant current of 2 C to a voltage of 2.94 V. This charge and discharge cycle was repeated 1 to 30 times.

In this case, the presence of drying and roll-pressing processes of a cathode, which were used in the lithium secondary batteries prepared in Example 3 and Comparative Examples 9 and 10, is presented in Table 1 below.

TABLE 1

|  | Drying | Roll-pressing |
|---|---|---|
| (A) Set | x | x |
| (B) Set | o | x |
| (C) Set | o | o |

Figure 3:
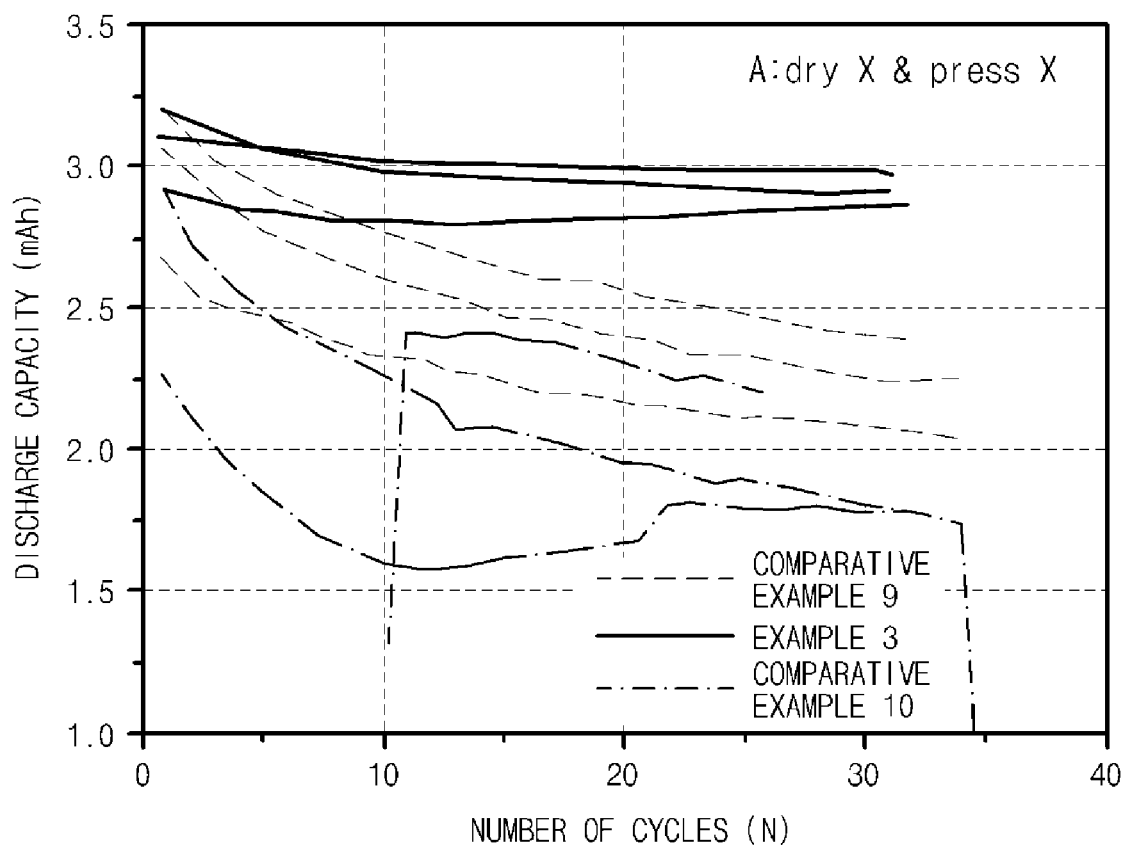
FIG. 3 is a graph illustrating the results of the measurement of lifetime characteristics at 45° C. of secondary batteries not subjected to both drying and roll-pressing of a cathode in lithium secondary batteries of Example 3 and Comparative Examples 9 and 10.
Figure 4:
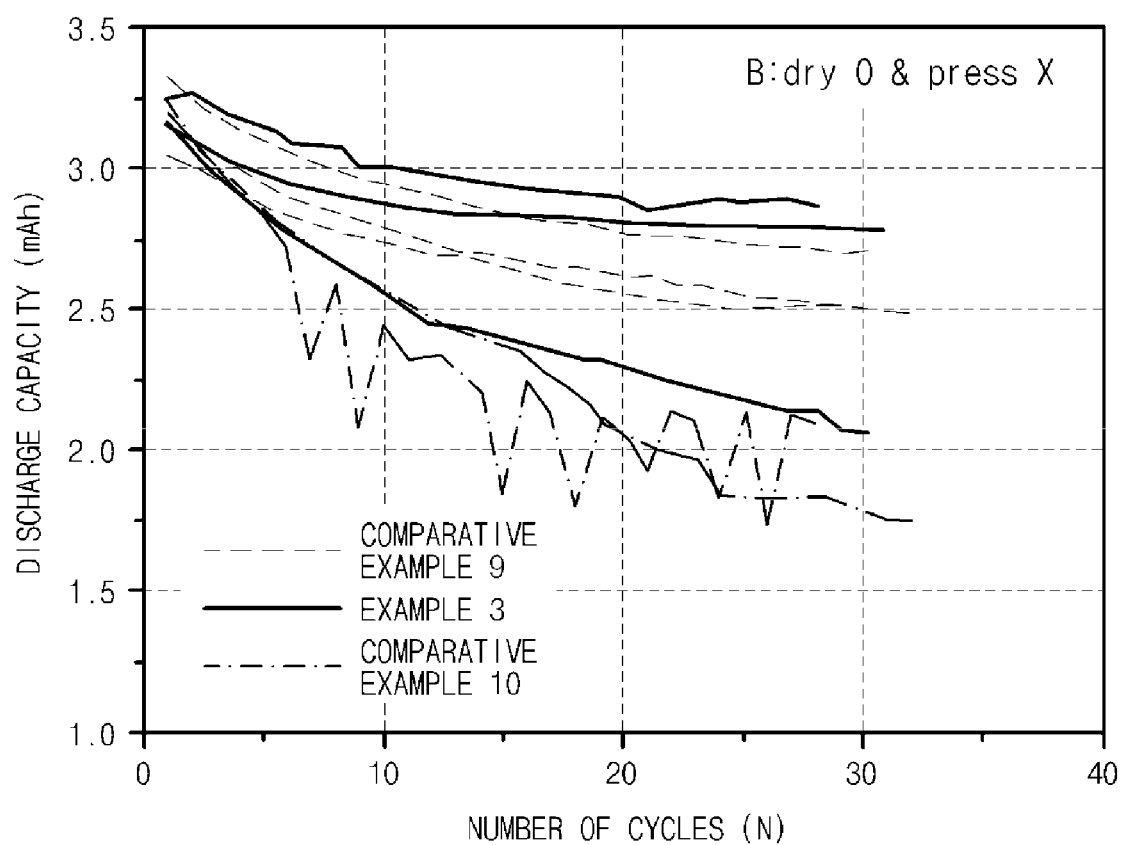
FIG. 4 is a graph illustrating the results of the measurement of lifetime characteristics at 45° C. of secondary batteries subjected to drying of a cathode and not subjected to roll-pressing of the cathode in the lithium secondary batteries of Example 3 and Comparative Examples 9 and 10.
Figure 5:
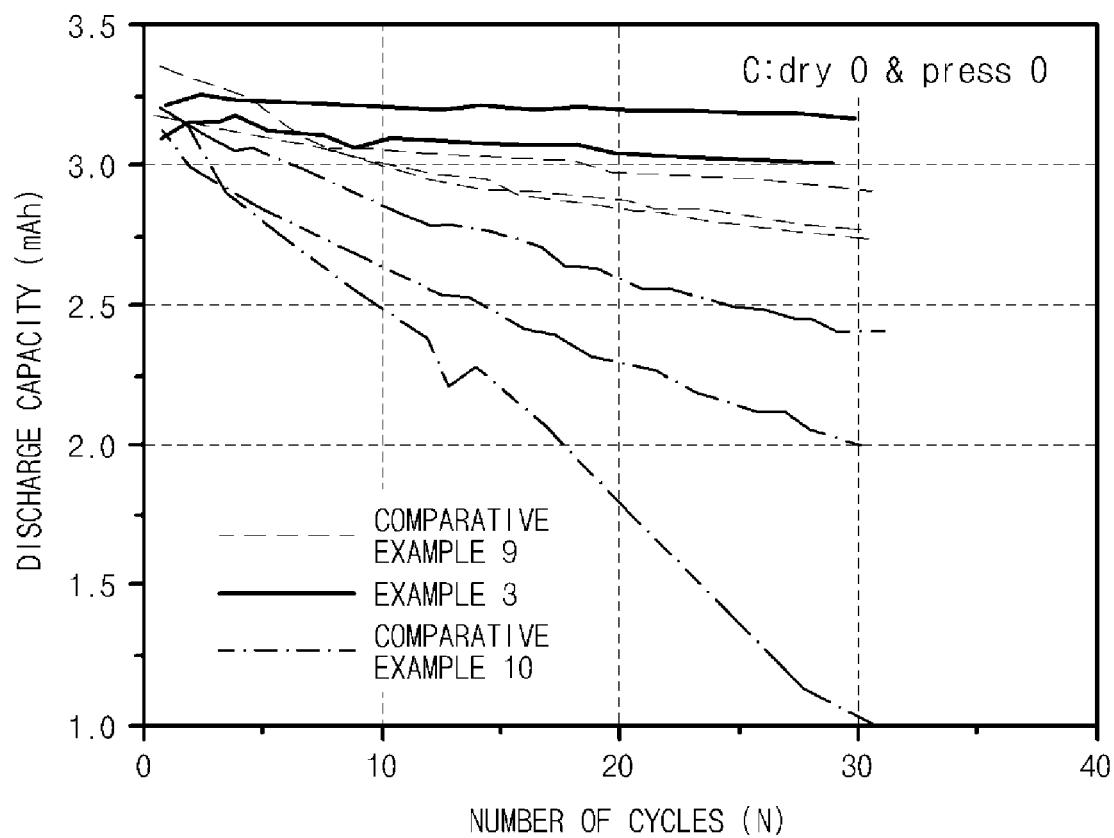
FIG. 5 is a graph illustrating the results of the measurement of lifetime characteristics at 45° C. of secondary batteries subjected to both drying and roll-pressing of a cathode in the lithium secondary batteries of Example 3 and Comparative Examples 9 and 10.

The results of the lifetime characteristics according to Table 1 are presented in FIGS. 3 to 5.

FIG. 3 is the results of lifetime characteristics of the lithium secondary batteries using a cathode not subjected to both drying and roll-pressing during the preparation of the cathode (A), FIG. 4 is the results of lifetime characteristics of the lithium secondary batteries using a cathode subjected to drying and not subjected to roll-pressing (B), and FIG. 5 is the results of lifetime characteristics of the lithium secondary batteries subjected to both drying and roll-pressing (C).

Specifically, as a result of the lifetime characteristics of the lithium secondary batteries using a cathode not subjected to both drying and roll-pressing as in FIG. 3, a slope of a graph illustrating the results of lifetime characteristics of Example 3 was moderate to a $30^{th}$ cycle. In contrast, it may be confirmed that slopes of graphs of the secondary batteries of Comparative Examples 9 and 10 were significantly reduced from a $10^{th}$ cycle. In particular, with respect to the lithium secondary battery of Comparative Example 10 using only TMSPa as an electrolyte solution additive, it may be understood that the slope was rapidly reduced from a $5^{th}$ cycle.

Similarly, in FIGS. 4 and 5, the lithium secondary battery of Example 3 exhibited stable lifetime characteristics regardless of the presence of drying and roll-pressing processes. In contrast, with respect to the lithium secondary batteries of Comparative Examples 9 and 10, the lifetime characteristics were degraded in comparison to the lifetime characteristics of Example 3 due to the effects of the drying and roll-pressing.

Figure 6:
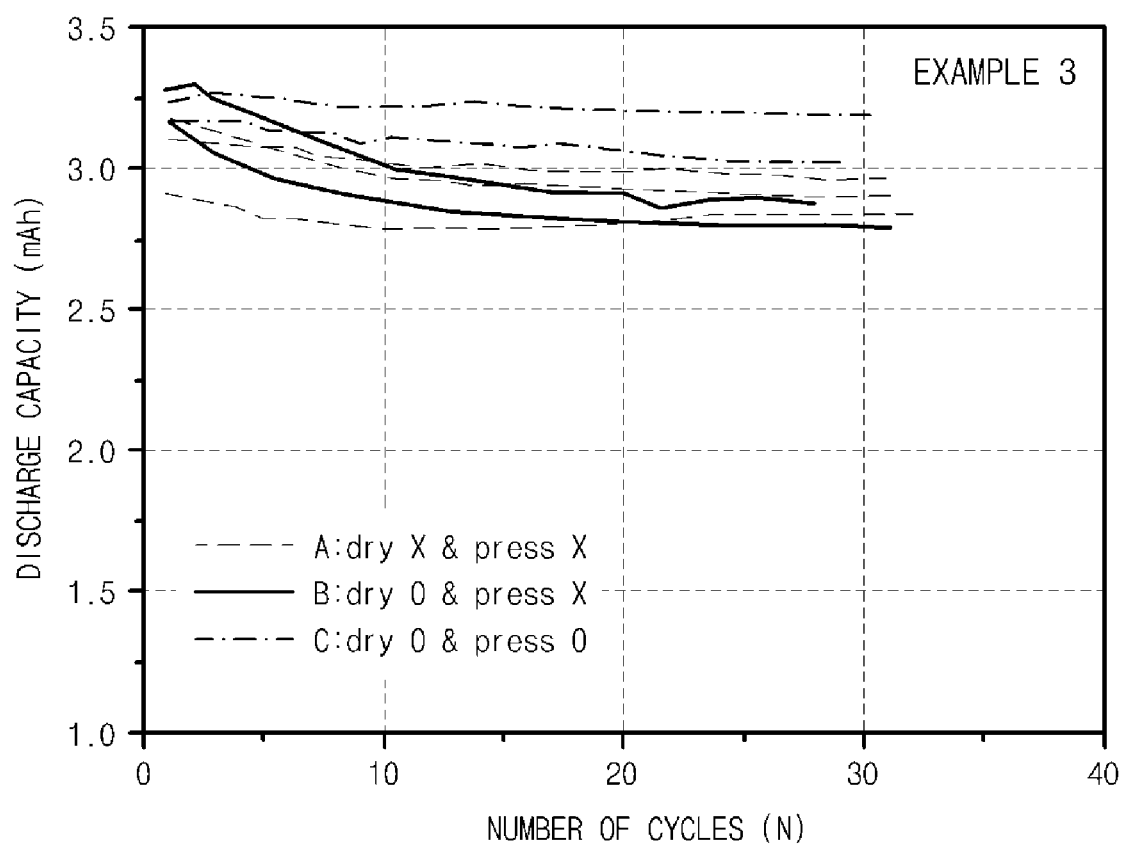
FIG. 6 is a graph illustrating the results of the measurement of lifetime characteristics at 45° C. according to the presence of drying and roll-pressing processes of a cathode in the lithium secondary batteries of Example 3.
Figure 7:
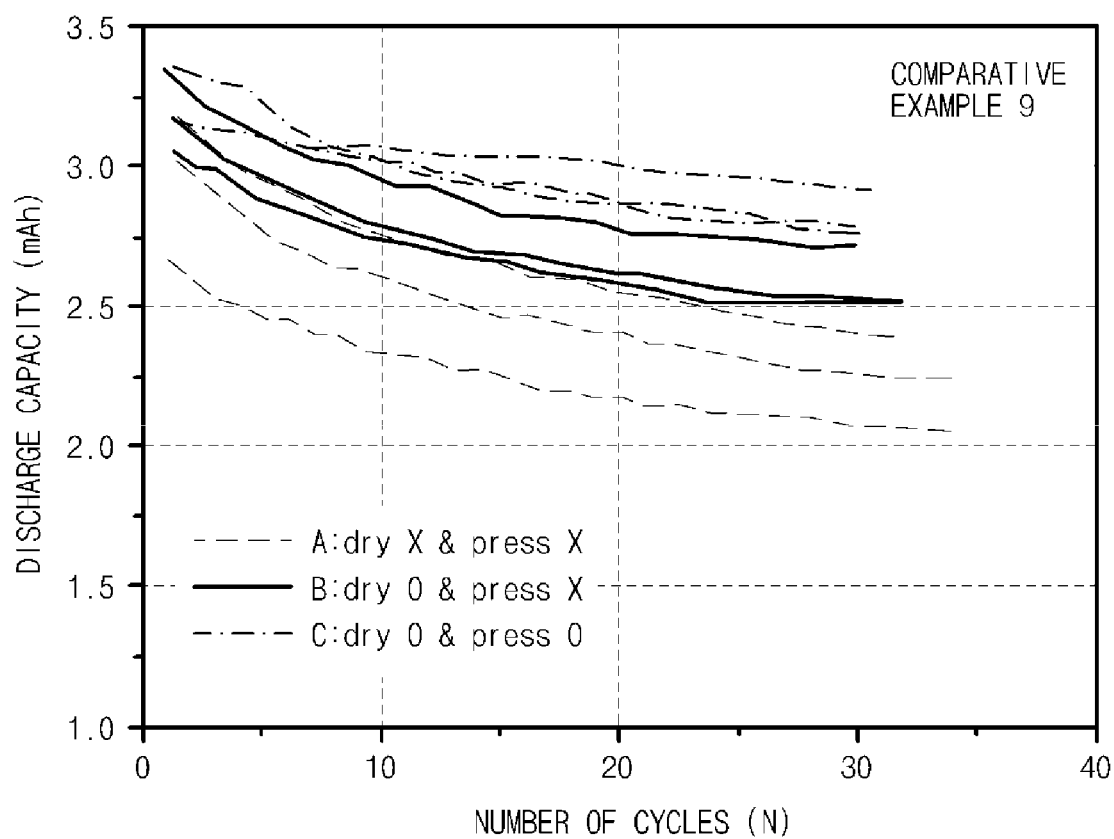
FIG. 7 is a graph illustrating the results of the measurement of lifetime characteristics at 45° C. according to the presence of drying and roll-pressing processes of a cathode in the lithium secondary batteries of Comparative Example 9.
Figure 8:
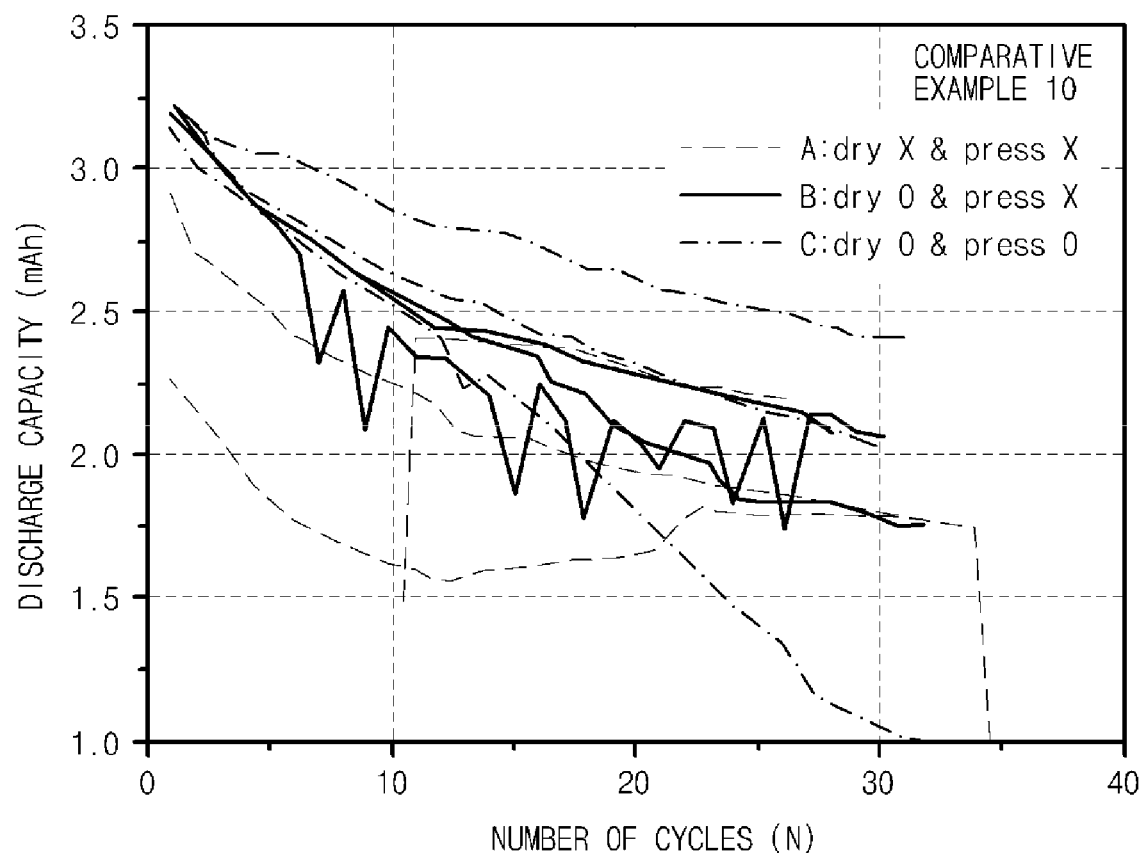
FIG. 8 is a graph illustrating the results of the measurement of lifetime characteristics at 45° C. according to the presence of drying and roll-pressing processes of a cathode in the lithium secondary batteries of Comparative Example 10.

FIGS. 6 to 8 are graphs separating the graphs of FIGS. 3 to 5 for each lithium secondary battery.

FIG. 6 is a graph of the lithium secondary batteries of Example 3 according to the presence of drying and roll-pressing processes. It may be confirmed that the lifetime characteristics of the lithium secondary batteries of Example 3 were all excellent to the $30^{th}$ cycle regardless of the presence of drying and roll-pressing processes.

In contrast, FIG. 7 is a graph of the lithium secondary batteries of Comparative Example 9 according to the presence of drying and roll-pressing processes. With respect to the lithium secondary batteries of Comparative Example 9, in the case that both drying and roll-pressing were performed, the lifetime characteristics were excellent to the $30^{th}$ cycle. However, in the case in which the drying or roll-pressing was not performed, the lifetime characteristics were reduced.

FIG. 8 is a graph of the lithium secondary batteries of Comparative Example 10 according to the presence of drying and roll-pressing processes. With respect to the lithium secondary batteries of Comparative Example 10, in the case that both drying and roll-pressing were performed, the lifetime characteristics were excellent to the $30^{th}$ cycle. However, in the case in which the drying or roll-pressing was not performed, the lifetime characteristics were reduced. In particular, it may be understood that the lithium secondary batteries of Comparative Example 10 were more affected by the presence of drying and roll-pressing processes in comparison to Comparative Example 9.

Preparation of Cathode Including Chemical Formula 1

Example 5

An additive mixture was prepared by mixing tetra(trimethylsilyl)pyrophosphate (compound (1)) and tris(trimethylsilyl)phosphate (TMSPa) at a weight ratio of 3:1, and a cathode mixture slurry was prepared by adding 2 wt % of the additive mixture, 92.12 wt % of $Li(Li_{0.2}Mn_{0.55}Ni_{0.15}Co_{0.1})O_2$ as a cathode active material, 2.94 wt % of carbon black as a conductive agent, and 2.94 wt % of polyvinylidene fluoride (PVdF) as a binder, based on a total weight of the cathode mixture slurry, to N-methyl-2-pyrrolidone (NMP) as a solvent. An about 20 µm thick aluminum (Al) thin film as a cathode collector was coated with the cathode mixture slurry and dried to prepare a cathode.

Preparation of Lithium Secondary Battery

Also, an anode mixture slurry was prepared by adding 96 wt % of carbon powder as an anode active material, 3 wt % of PVdF as a binder, and 1 wt % of carbon black as a conductive agent to NMP as a solvent. A 10 µm thick copper (Cu) thin film as an anode collector was coated with the anode mixture slurry and dried, and the Cu thin film was then roll-pressed to prepare an anode.

$LiPF_6$ was dissolved in an electrolyte solution solvent having a composition, in which a volume ratio of ethylene carbonate (EC):dimethyl carbonate (DMC):ethylmethyl carbonate (EMC) was 3:4:3, to obtain a $LiPF_6$ concentration of 1 M. As an additive for a non-aqueous electrolyte solution, vinylene carbonate (VC) and propane sultone (PS) were added at a weight ratio of 1:1.5 to prepare a non-aqueous electrolyte.

A polymer type battery was prepared by a typical method using a polyethylene (PE) separator with the cathode and anode thus prepared, and a lithium secondary battery was then completed by injecting the prepared non-aqueous electrolyte solution.

Example 6

A cathode and a lithium secondary battery were prepared in the same manner as in Example 5 except that tetra (trimethylsilyl)pyrophosphate was used alone instead of using an additive mixture during the preparation of the cathode of Example 5.

Comparative Example 11

A cathode and a lithium secondary battery were prepared in the same manner as in Example 5 except that an additive mixture was not used during the preparation of the cathode of Example 5.

Comparative Example 12

A cathode and a lithium secondary battery were prepared in the same manner as in Example 5 except that TMSPa was used alone instead of using an additive mixture during the preparation of the cathode of Example 5.

Experimental Example 3

Lifetime Characteristics at 45° C.—Performing Drying and Roll-Pressing of Cathode The lithium secondary batteries (based on a battery capacity of 3.26 mAh) prepared in Examples 5 and 6 and Comparative Examples 11 and 12 were charged at a constant current of 1 C to a voltage of 4.35 V at 45° C., and thereafter, the secondary batteries were charged at a constant voltage of 4.35 V and the charge was terminated when the charge current was 0.163 mAh. After the batteries were left standing for 10 minutes, the batteries were discharged at a constant current of 2 C to a voltage of 2.94 V. This charge and discharge cycle was repeated 1 to 100 times.

In this case, both dying and roll-pressing were performed on the cathodes used in the lithium secondary batteries which were prepared in Examples 5 and 6 and Comparative Examples 11 and 12. The results of the lifetime characteristics are presented in FIG. 9.

Figure 9:
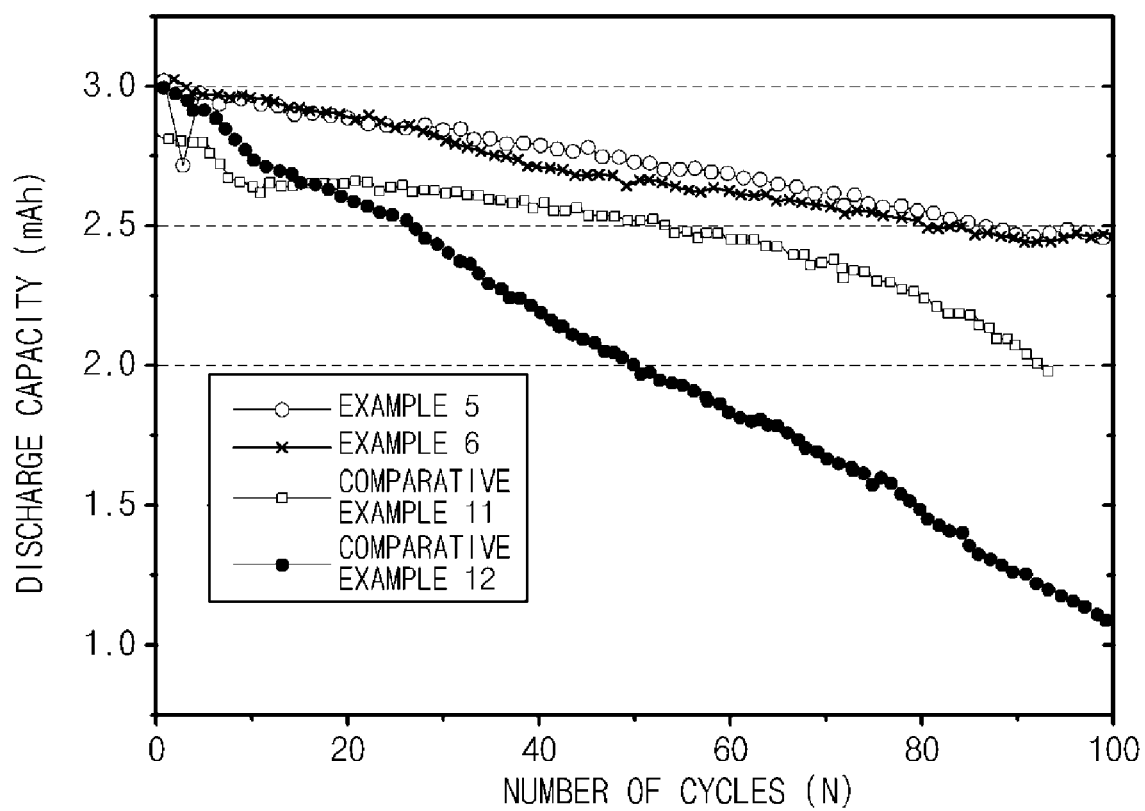
FIG. 9 is a graph illustrating the results of the measurement of lifetime characteristics at 45° C. of lithium secondary batteries of Examples 5 and 6 and Comparative Examples 11 and 12.

Referring to FIG. 9, the lithium secondary batteries of Examples of 5 and 6 of the present invention including tetra(trimethylsilyl)pyrophosphate (compound (1)) in the cathode as an additive had a moderate slope to the $100^{th}$ cycle.

Also, the lifetime characteristics of Example 5 using the additive mixture, in which tetra(trimethylsilyl)pyrophosphate (compound (1)) and TMSPa were mixed, were better than those of Example 6 using tetra(trimethylsilyl)pyrophosphate (compound (1)) alone to the $100^{th}$ cycle. However, Example 5 exhibited a significant difference from Comparative Examples 11 and 12 which did not include tetra(trimethylsilyl)pyrophosphate in the cathodes.

Specifically, discharge capacities of Examples 5 and 6 of the present invention were improved by about 25% at a 90th cycle in comparison to Comparative Example 11 in which a cathode additive was not used, and were improved by about 150% or more at the $100^{th}$ cycle in comparison to Comparative Example 12 in which tetra(trimethylsilyl)pyrophosphate was not included and only TMSPa was added.

Therefore, as a result of the lifetime characteristics of the lithium secondary batteries of FIG. 9, in the case that tetra(trimethylsilyl)pyrophosphate (compound (1)) was used alone or a mixed additive of tetra(trimethylsilyl)pyrophosphate (compound (1)) and tris(trimethylsilyl)phosphate (TMSPa) was used as in the examples of the present invention, it may be confirmed that excellent lifetime characteristics at high temperature and high voltage were obtained in comparison to the comparative examples which did not include the compound represented by Chemical Formula 1.

The invention claimed is:

1. A cathode slurry comprising:
a lithium transition metal oxide; and
a compound represented by Chemical Formula 1:

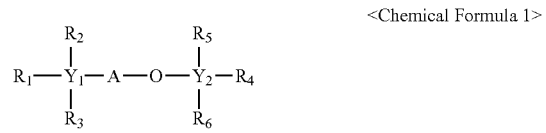

<Chemical Formula 1> where $Y_1$ and $Y_2$ are each independently silicon (Si) or tin (Sn),
$R_1$ to $R_6$ are each independently hydrogen or a $C_1$-$C_{10}$ alkyl group, and
A is

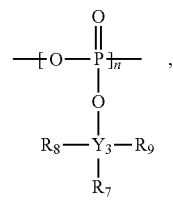

where $Y_3$ is Si or Sn,
$R_7$ to $R_9$ are each independently hydrogen or a $C_1$-$C_{10}$ alkyl group, and
n is between 2 and 4.

2. The cathode slurry of claim 1, wherein the compound represented by Chemical Formula 1 is any one selected from the group consisting of compounds of (1) to (3), or a mixture of two or more thereof:

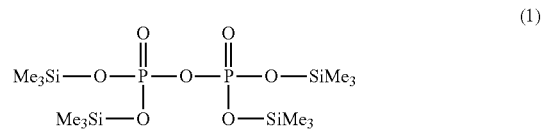

(1)

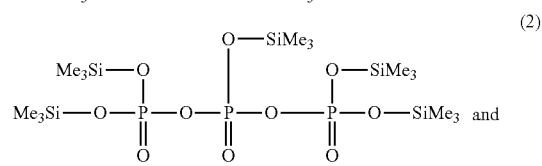

(2)

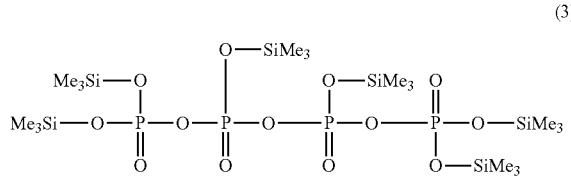

(3)

wherein Me represents $CH_3$.

3. The cathode slurry of claim 1, further comprises a compound represented by Chemical Formula 2:

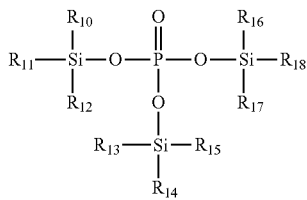

<Chemical Formula 2> where $R_{10}$ to $R_{18}$ are each independently hydrogen or a $C_1$-$C_{10}$ alkyl group.

4. The cathode slurry of claim 3, wherein the compound represented by Chemical Formula 2 is tris(trimethylsilyl) phosphate (TMSPa).

5. The cathode slurry of claim 3, wherein a mixing ratio of the compound represented by Chemical Formula 1 to the compound represented by Chemical Formula 2 is in a range of 1:0.1 to 1:2 as a weight ratio.

6. The cathode slurry of claim 1, wherein the compound represented by Chemical Formula 1 is included in an amount of 0.01 wt % to 5 wt % based on a total weight of the lithium transition metal oxide.

7. The cathode slurry of claim 1, wherein the lithium transition metal oxide is a compound represented by Chemical Formula 3:

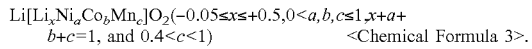

<Chemical Formula 3>.

8. A cathode formed by using the cathode slurry of claim 1.

9. A lithium secondary battery comprising the cathode of claim 8.

10. The lithium secondary battery of claim 9, wherein a charge voltage of the lithium secondary battery is in a range of 4.3 V to 5.0 V.

11. A cathode slurry comprising:
a lithium transition metal oxide; and
a compound selected from the group consisting of compounds of (4) to (6), or a mixture of two or more thereof:

(4)

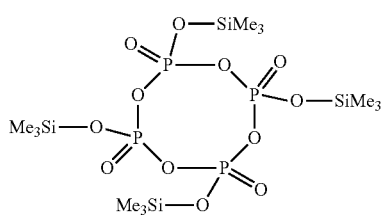

(5)

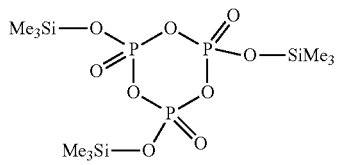

and (6)

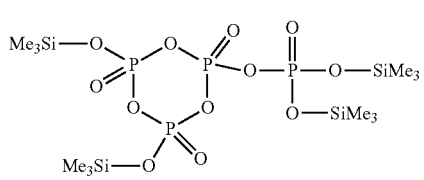

wherein Me represents $CH_3$.

12. A cathode formed by using the cathode slurry of claim 11.

13. A lithium secondary battery comprising the cathode of claim 12.

* * * * *